Feb. 1, 1944.                F. A. GRUETJEN                2,340,808
                        EXTRUSION NOZZLE WIRE GUIDE
                            Filed July 10, 1941
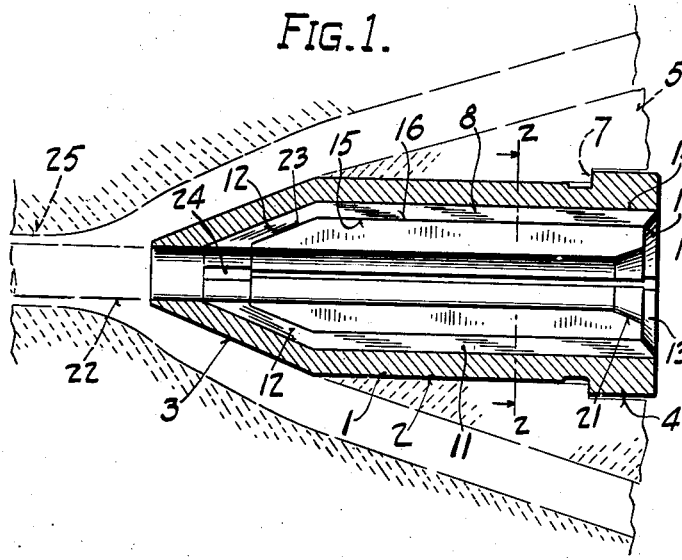
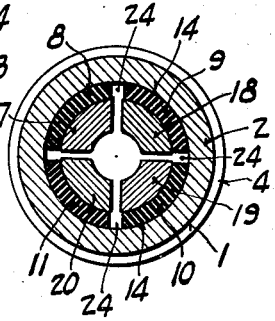
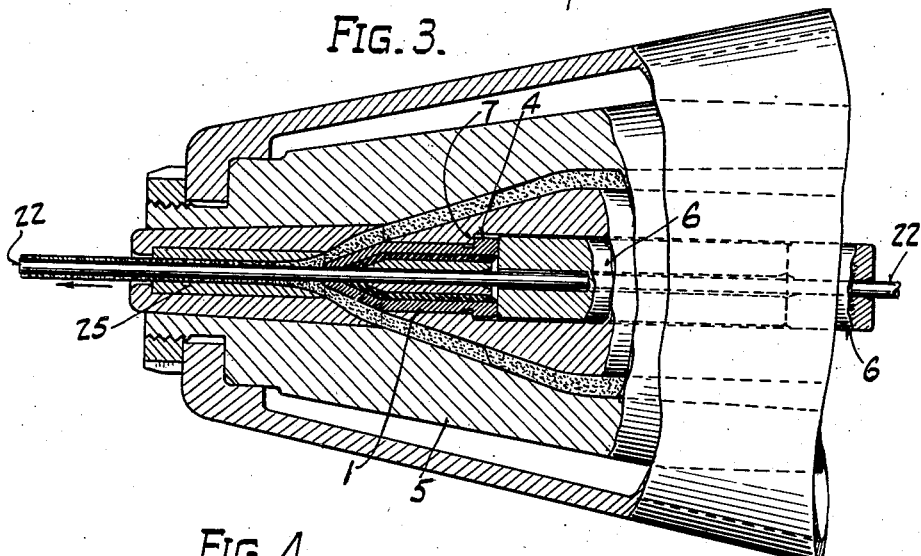
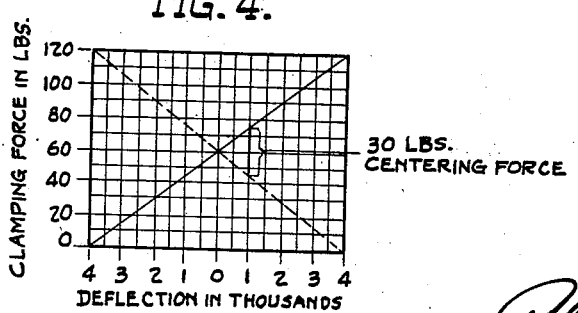
Frederick A. Gruetjen
INVENTOR.
BY
ATTORNEY.

Patented Feb. 1, 1944

2,340,808

UNITED STATES PATENT OFFICE 2,340,808

EXTRUSION NOZZLE WIRE GUIDE

Frederick A. Gruetjen, Milwaukee, Wis., assignor to A. O. Smith Corporation, Milwaukee, Wis., a corporation of New York Application July 10, 1941, Serial No. 401,860

7 Claims. (Cl. 18—13)

This invention relates to a wire guide and more particularly to one for use in the nozzle of an extrusion machine for coating weld rods and other similar objects.

The wire guide serves to axially align the weld rods passing therethrough with the channel of the nozzle so that a more perfect coating operation will be performed.

Rods employed for coating purposes have certain tolerances in diameter caused in manufacture.

Also the plastic material utilized for coatings may have variable degrees of consistency, and its rate or speed of flow in the extrusion nozzle may fluctuate.

These conditions heretofore have caused weld rods passing through the extrusion nozzle channel to be deflected from the center of such channel to such an extent that imperfect coatings result having an eccentricity greater than the tolerance required.

The object of this invention is to alleviate these past difficulties by providing a wire guide with adjustable clamping pressures that will automatically axially align weld rods, passing therethrough, with the channel of the extrusion nozzle and prevent any excessive degree of deflection of the rods from the center of such channel.

Other objects will be clear from the following description and accompanying drawing in which:

Figure 1 is a central longitudinal section of a wire guide embodying the invention;

Fig. 2 is a section taken on line 2—2 of Figure 1;

Fig. 3 is a side elevation, partly in section of the forward end of an extrusion nozzle showing the location of the wire guide therein; and Fig. 4 is a force deflection diagram illustrating the clamping pressure applied by the wire guide on the rods passing therethrough.

The wire guide 1 shown by the drawing comprises an outer metallic shell 2 which may be generally cylindrical in shape with its forward end tapered as at 3 and its rear end flanged on its outer surface as at 4 to prevent endwise movement.

Wire guide 1 is secured inside extrusion nozzle 5 by an annular screw, not shown, which bears against wire guide spacer 6 and forces the flange 4 firmly against a shoulder 7 of the nozzle. The guide is of sufficient length to be wear resistant and to properly perform the alignment action which is the main purpose of its operation.

Segments 8, 9, 10 and 11, preferably of rubber or some similar compressible and resilient material, with their forward ends tapered as at 12 and their rear ends tapered on their inner surfaces as at 13, are preferably secured by their outer surfaces 14 to shell 2, as by vulcanization. The embodiment showing segments 8, 9, 10 and 11 is not intended to limit the number of such segments nor to restrict the material used to segmentation, as such material may be secured in wire guide 1 in solid ring formation.

If a solid ring of compressible and resilient material is used, it should have greater compressibility than in the case where segments 8, 9, 10 and 11 are employed since such solid ring material is not as free to move laterally or circumferentially when radially compressed, as it is in the preferred embodiment.

It is possible also to employ mechanical members such as springs instead of compressible and resilient material.

The inner surfaces 15 of segments 8, 9, 10 and 11 are preferably secured to outer surfaces 16 of guide segments 17, 18, 19 and 20, as by vulcanization. The embodiment shown is not intended to limit the number of guide segments that may be utilized.

The guide segments 17, 18, 19 and 20, preferably of Carboloy, are tapered at the rear edges of their inner surface as at 21 to facilitate entry of weld rod 22 and are also tapered on the outer surfaces of their forward ends as at 23.

Segments 8, 9, 10 and 11 are made of rubber of predetermined resiliency and compressibility so that when the inner surfaces 21 of respective guide segments 17, 18, 19 and 20 secured thereto, engage weld rod 22, said segments 8, 9, 10 and 11 are compressed and expand circumferentially into crevices 24.

The compressibility and resiliency of segments 8, 9, 10 and 11, creates the clamping or compression force that axially aligns weld rod 22 with the channel 25 of extrusion nozzle 5.

Weld rods with different diameters due to tolerances in manufacture cause the total pressure exerted by segments 8, 9, 10 and 11 to vary with these differences but under such conditions the pressure exerted by each segment is always equal to that exerted by each of the other segments and the weld rod will always be centered relative to the nozzle.

However, as the lateral pressure exerted by the plastic material flowing against weld rods passing through extrusion nozzle 5 varies and becomes unbalanced due to differences in consistency in such material or to fluctuation in speed of flow, unequal clamping pressure would be required to be applied on either side of the circumference of the weld rod by wire guide 1 to hold the rod in axial alignment with the channel of extrusion nozzle 5.

As a practical matter even though the freely floating center of wire guide 1 axially aligns weld rods with the channel of extrusion nozzle 5 upon their entry therein, such axial alignment cannot be rigidly maintained during the complete passage of rods therethrough. However, coated weld rods have tolerances of coating eccentricity which permit some deflection of weld rods passing through the extrusion nozzle 5 without destroying the desired perfection of the coating. Thus axial alignment of weld rods with the channel of extrusion nozzle 5 actually means alignment within the allowable tolerances of eccentricity of the coating.

The preloading of the rubber of wire guide 1 and the application of unequal pressures by the wire guide on weld rods passing therethrough is of such nature as to offset the pressure against the weld rods by the coating material, thus aligning the rods in extrusion nozzle 5 within the tolerances of eccentricity found on coated weld rods.

Fig. 4 graphically illustrates the operation of wire guide 1. It is to be understood that Fig. 4 is merely a theoretical illustration disclosing a wire guide wherein the pressure exerted bears a constant ratio to the deflection of the guide segments. Practically it is discernible that this condition might only exist in the first stages of deflection where the pressure exerted by the guide through its compression elements would not be excessive. When the deflection, however, is excessive, compressing the resilient elements of wire guide 1 to within their ultimate stages of compressibility, the pressure exerted per one thousandth of an inch of movement, would be greater than the pressure exerted per one thousandth of an inch of movement in the earlier stages of the deflection.

The graph as shown indicates that when no weld rods are passing through wire guide 1, the segments 8, 9, 10 and 11 exert no clamping pressure. However, immediately upon the entry of a weld rod into wire guide 1, the segments 8, 9, 10 and 11 are each compressed a given amount, illustrated as four thousandths of an inch, and each respective individual segment will then exert a clamping pressure of sixty pounds on weld rod 22.

This preloading of wire guide 1 is sufficient to offset the normal variations in pressure exerted by the plastic material flowing against weld rod 22.

The action of wire guide 1, as illustrated by the graph in Fig. 4, can be further shown by another example.

Assume that the consistency of plastic material coating weld rod 22 is constantly changing causing the plastic pressure on one side of weld rod 22 to likewise change relative to that on the other.

Further assume that the maximum change of the plastic pressure occurring in operation causes weld rod 22 engaging guide segment 17 to force such guide segment outwardly one thousandth of an inch compressing rubber segment 8. The corresponding opposite side of weld rod 22 engages guide segment 19 and that guide segment moves inwardly one thousandth of an inch decompressing rubber segment 10.

With this radial movement of guide segments 17 and 19, the clamping pressure exerted by their respective compression segments 8 and 10 is automatically adjusted so that segment 8 exerts a centering pressure of seventy-five pounds on weld rod 22 and segment 10 a pressure of forty-five pounds.

The thirty pounds difference between the pressures exerted by segments 8 and 10 is sufficient centering force to offset the maximum changes in pressures of the plastic material flowing against weld rod 22 in the channel of extrusion nozzle 5. Thus the deflection of weld rod 22 will be of so small a degree that the coating on such rod will be within the tolerance of two thousandths of an inch in difference between the thickness of the sides. If some other tolerance is desired the material backing the guide members may be constructed to give either greater or less clamping pressure per unit distance of radial compression.

Various embodiments of the invention may be made within the scope of the claims.

I claim:

1. A wire guide aligning a rod with an extrusion nozzle for applying a coating thereto having a predetermined tolerance limit of eccentricity, comprising a plurality of radially movable segments of wear resisting material engaging the rod adjacent its entry into the nozzle, and a resilient backing for said segments pressing the same radially inwardly to prevent said segments from being forced to positions eccentric to the extrusion nozzle greater than the tolerance limit of eccentricity of the coating.

2. A wire guide aligning a rod with an extrusion nozzle for applying a coating thereto having a predetermined tolerance limit of eccentricity, comprising a plurality of radially movable segments of wear resisting material engaging the rod adjacent its entry into the nozzle, and a resilient compressible backing for said segments pressing the same radially inwardly under a predetermined preload compression to prevent said segments from being forced to positions eccentric to the extrusion nozzle greater than the tolerance limit of eccentricity of the coating.

3. In a device of the class described, a cylindrical shell, a plurality of radially movable segments disposed to engage a rod moving axially through said shell to center said rod, and resilient compressible material between said segments and shell and engaging said segments to apply radially inward pressure to said segments.

4. In an extrusion nozzle wire guide, a cylindrical shell, a plurality of radially movable segments disposed to engage a rod moving axially through said shell to center said rod, resilient compressible material between said segments and shell and engaging said segments to apply radially inward pressure to said segments and to resist longitudinal movement of said segments in the direction of movement of the rod.

5. In an extrusion nozzle wire guide, a cylindrical shell, a plurality of radially movable segments disposed to engage a rod moving axially through said shell to center said rod, and means between said segments and shell and surrounding and contacting said segments to apply radially inward pressure to said segments, said shell being contracted at its forward end to substantially prevent relative endwise movement of said segments therein in the direction of movement of the rod.

6. In a device of the class described, a cylindrical shell, a plurality of radially movable segments disposed therein to engage a rod moving axially through said shell to center said rod, and a separate means disposed between each of said segments and the shell for applying radially inward pressure to the respective segments.

7. In a device of the class described, a cylindrical shell, a plurality of radially movable segments disposed therein to engage a rod moving axially through said shell to center said rod, and resilient radially compressible material disposed between said segments and shell to apply radially inward pressure to said segments.

FREDERICK A. GRUETJEN.